US012323538B2

(12) United States Patent
Maximov et al.

(10) Patent No.: US 12,323,538 B2
(45) Date of Patent: Jun. 3, 2025

(54) ATTESTATION OF TRUSTED EXECUTION ENVIRONMENTS

(71) Applicant: TELEFONAKTIEBOLAGET LM ERICSSON (PUBL), Stockholm (SE)

(72) Inventors: Alexander Maximov, Lund (SE); Bernard Smeets, Dalby (SE); Lina Pålsson, Genarp (SE)

(73) Assignee: Telefonaktiebolagget LM Ericsson (Publ), Stockholm (SE)

( * ) Notice: Subject to any disclaimer, the term of this patent is extended or adjusted under 35 U.S.C. 154(b) by 769 days.

(21) Appl. No.: 17/600,992

(22) PCT Filed: Apr. 1, 2019

(86) PCT No.: PCT/EP2019/058161
§ 371 (c)(1),
(2) Date: Oct. 1, 2021

(87) PCT Pub. No.: WO2020/200411
PCT Pub. Date: Oct. 8, 2020

(65) Prior Publication Data
US 2022/0158856 A1 May 19, 2022

(51) Int. Cl.
*H04L 9/32* (2006.01)
*H04L 9/08* (2006.01)

(52) U.S. Cl.
CPC .......... *H04L 9/3271* (2013.01); *H04L 9/0838* (2013.01); *H04L 9/085* (2013.01)

(58) Field of Classification Search
CPC ..... H04L 9/3271; H04L 9/0838; H04L 9/085; H04L 9/0894; H04L 63/06; H04L 2209/127; G06F 21/53; G06F 21/57
See application file for complete search history.

(56) References Cited

U.S. PATENT DOCUMENTS

| 2016/0350534 | A1 | 12/2016 | Poornachandran et al. |
| 2018/0114012 | A1 | 4/2018 | Sood et al. |
| 2018/0212760 | A1 | 7/2018 | Costa |
| 2018/0212939 | A1 | 7/2018 | Costa |
| 2018/0241572 | A1 | 8/2018 | Miele et al. |
| 2018/0285560 | A1* | 10/2018 | Negi ............... G06F 21/72 |
| 2020/0014546 | A1* | 1/2020 | Karame ............ G06F 21/57 |

FOREIGN PATENT DOCUMENTS

CN 107544918 A 1/2018

OTHER PUBLICATIONS

Brandenburger et al., "Blockchain and Trusted Computing: Problems, Pitfalls, and a Solution for Hyperledger Fabric", Arviv.org, Cornell University Library, May 22, 2018.
Tsai et al., "Graphene-SGX: A Practical Library OS for Unmodified Applications on SGX", USENIX Association, 2017 USENIX Annual Technical Conference, Jul. 12-14, 2017, Santa Clara, CA, USA.

* cited by examiner

*Primary Examiner* — Izunna Okeke
(74) *Attorney, Agent, or Firm* — Weisberg I.P. Law, P.A.

(57) ABSTRACT

There is provided mechanisms for attesting a first TEE residing on a first node. A method is performed by a second TEE also residing on the first node. The method comprises obtaining a request from the first TEE to be attested. The method comprises, in response thereto, obtaining a shared key from a third TEE residing on a second node. The method comprises performing local attestation of the first TEE, whereby the first TEE is provided with the shared key from the second TEE.

16 Claims, 4 Drawing Sheets

ATTESTATION OF TRUSTED EXECUTION ENVIRONMENTS

PRIORITY CLAIM

This application is a national stage application of International Patent Application No. PCT/EP2019/058161, filed Apr. 1, 2019, the disclosure disclosures of which is hereby incorporated in its entirety by reference.

TECHNICAL FIELD

Embodiments presented herein relate to methods, computer program, and a computer program product for attestation of trusted execution environments (TEEs). Embodiments presented herein further relate to TEEs configured for performing the attestation.

BACKGROUND

Remote as well as local attestation makes it possible for a user, hereafter called tenant, to attest a TEE before populating it with secret information. Remote attestation can be performed within the system as long as the attesting instance has knowledge about acceptable nodes.

Existing systems for execution of TEEs might provide a key handling mechanism allowing the tenant to store keys securely and even protected from the provider of the untrusted computational, or cloud, environment in which the TEEs are provided. This enables the tenant to store and handle secret information in the untrusted computational, or cloud, environment when running the TEEs, and at rest using sealing.

TEEs can be used to create Virtual Network Functions (VNFs). When creating VNFs through micro-services using TEEs in containers, a comparably large and dynamically varying number of TEEs needs to be populated. A TEE image can be created with default settings that simplifies the creation of further TEEs. However, since the same TEE image might be used by different tenants, the TEE image should not be hard-coded with security sensitive information such as an identity giving the TEE access to a certain system data. An identity should instead be given to each TEE once it is initiated for a certain tenant's system. Again, due to the dynamically varying number of TEEs that needs to be populated, it could be challenging for the tenant to populate its TEEs with such security sensitive information in the untrusted computational, or cloud, environment in which the TEEs are provided.

Once a TEE is populated with an initial identity-key, this key gives the TEE access to data belonging to the system. Such data might be kept in a secure storage. In this way an ephemeral TEE is enabled to access states, keys and other data, directly from other TEEs, or stored by another ephemeral TEE. In this way, the system of TEEs as a whole can keep a state and advance even if every single TEE is ephemeral and potentially state-less. Since such a setup will require that the TEEs are attested and populated all the time as the system scales up and down by starting more TEEs or stopping them, performing remote attestation of each TEE could be too inefficient as performing the attestation requires signalling to flow back and forth through the entire system to a remote attest function trusted by the tenant.

Hence, there is still a need for improved mechanisms for attestation of TEEs.

SUMMARY

An object of embodiments herein is to provide efficient attestation of TEEs that does not suffer from the above disclosed issues, or at least where the above disclosed issues are mitigated or reduced.

According to a first aspect there is presented a method for attesting a first TEE residing on a first node. The method is performed by a second TEE also residing on the first node. The method comprises obtaining a request from the first TEE to be attested. The method comprises, in response thereto, obtaining a shared key from a third TEE residing on a second node. The method comprises performing local attestation of the first TEE, whereby the first TEE is provided with the shared key from the second TEE.

According to a second aspect there is presented a second TEE for attesting a first TEE residing on a first node. The second TEE also resides on the first node. The second TEE comprises processing circuitry. The processing circuitry is configured to cause the second TEE to obtain a request from the first TEE to be attested. The processing circuitry is configured to cause the second TEE to, in response thereto, obtain a shared key from a third TEE residing on a second node. The processing circuitry is configured to cause the second TEE to perform local attestation of the first TEE, whereby the first TEE is provided with the shared key from the second TEE.

According to a third aspect there is presented a second TEE for attesting a first TEE residing on a first node. The second TEE also resides on the first node. The second TEE comprises an obtain module configured to obtain a request from the first TEE to be attested. The second TEE comprises an obtain module configured to, in response thereto, obtain a shared key from a third TEE residing on a second node. The second TEE comprises an attestation module configured to perform local attestation of the first TEE, whereby the first TEE is provided with the shared key from the second TEE.

According to a fourth aspect there is presented a computer program for attesting a first TEE residing on a first node. The computer program comprises computer program code which, when run on processing circuitry of a second TEE also residing on the first node, causes the second TEE to perform a method according to the first aspect.

According to a fifth aspect there is presented a method for attesting a second TEE residing on a first node. The method is performed by a third TEE residing on a second node. The method comprises obtaining a request from the second TEE to be attested. The method comprises, in response thereto, obtaining a shared key for the second TEE. The method comprises performing remote attestation of the second TEE, whereby the second TEE is provided with the shared key from the third TEE.

According to a sixth aspect there is presented a third TEE for attesting a second TEE residing on a first node. The third TEE resides on a second node. The third TEE comprises processing circuitry. The processing circuitry is configured to cause the third TEE to obtain a request from the second TEE to be attested. The processing circuitry is configured to cause the third TEE to, in response thereto, obtain a shared key for the second TEE. The processing circuitry is configured to cause the third TEE to perform remote attestation of the second TEE, whereby the second TEE is provided with the shared key from the third TEE.

According to a seventh aspect there is presented a third TEE for attesting a second TEE residing on a first node. The third TEE resides on a second node. The third TEE comprises an obtain module configured to obtain a request from the second TEE to be attested. The third TEE comprises an obtain module configured to, in response thereto, obtain a shared key for the second TEE. The third TEE comprises an attestation module configured to perform remote attestation of the second TEE, whereby the second TEE is provided with the shared key from the third TEE.

According to an eight aspect there is presented a computer program for attesting a second TEE residing on a first node, the computer program comprising computer program code which, when run on processing circuitry of a third TEE residing on a second node, causes the third TEE to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously these methods, these TEEs, and these computer programs provide efficient attestation of the first TEE.

Advantageously, the disclosed attestation does not suffer from the above disclosed issues.

Advantageously these methods, these TEEs, and these computer programs provide an efficient (faster and using less communication resources) and close-by attestation and population of TEEs.

Advantageously these methods, these TEEs, and these computer programs provide a simple, flexible and fast way for a tenant to populate TEEs in a distributed computational, or cloud, environment. This is achieved by the fact that remote attestation and access to a remote attester only is needed once, and further by the fact that the attestation is kept as locally as possible, meaning that local attestation, i.e., population within the same node only, is sufficient in many population scenarios.

Advantageously these methods, these TEEs, and these computer programs are particularly advantageous in systems of micro-service based VNFs where a large number of ephemeral, initially unpopulated and potentially stateless TEEs should form a system and the need of long-lived, static components should be minimized, and where the number of TEEs varies continuously through up- and downscaling to meet time varying network capacity demands.

Advantageously, the first TEE might, during the rest of its lifetime, use the shared key as a proof to obtain access to other system data kept by another TEE or kept in secure storage which can be local or remote.

It is to be noted that any feature of the first, second, third, fourth, fifth, sixth seventh, eight, and ninth aspects may be applied to any other aspect, wherever appropriate. Likewise, any advantage of the first aspect may equally apply to the second, third, fourth, fifth, sixth, seventh, eight, and/or ninth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
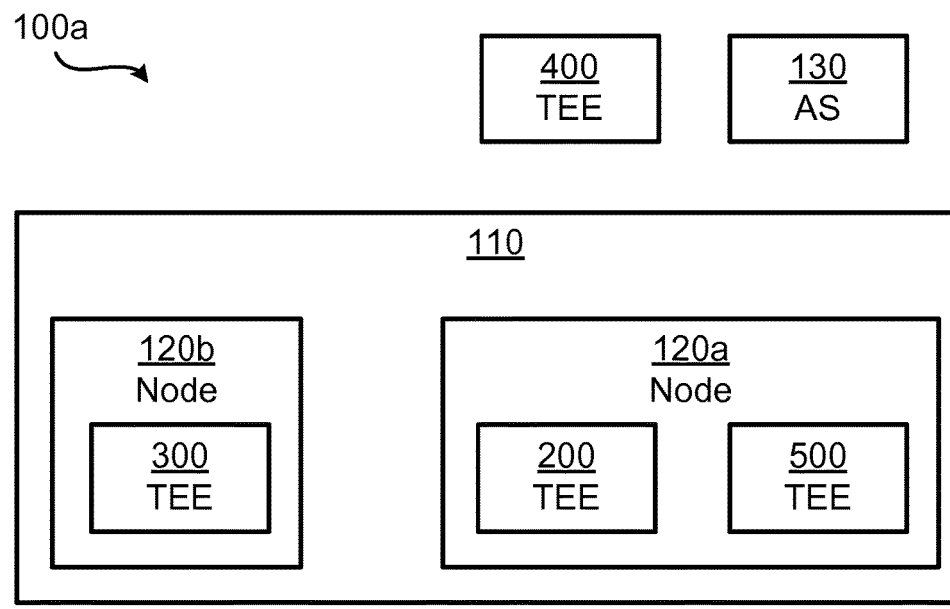
FIG. 1 is a schematic diagram illustrating a system according to embodiments.

FIG. 1 is a schematic diagram illustrating a system 100a where embodiments presented herein can be applied. The system 100 comprises TEEs 500, 200, 300, 400, hereinafter denoted a first TEE 500, a second TEE 200, a third TEE 300, and a fourth TEE 400. The first TEE 500 and the second TEE 200 reside on a first node 120a. The third TEE 300 resides on a second node 120b. In some examples the first node 120a and the second node 120b reside in an untrusted execution, or cloud, environment 110.

In some examples the first TEE 500 and the second TEE 200 share hardware on the first node 120a. The first node 120a and the second node 120b are not on the same hardware. Thus the first TEE 500 and the second TEE 200 do not share hardware with the third TEE 300. In some examples each of the first TEE 500, the second TEE 200, and the third TEE 300 (and the fourth TEE 400) execute functionality of a virtual network function (VNF). In some examples each of the first TEE 500, the second TEE 200, and the third TEE 300 (and the fourth TEE 400) is a respective enclave instance. An ephemeral second TEE 200 might be implemented as a sidecar or daemon, in the same pod as the first TEE 500. Thus, in some examples the second TEE 200 is provided as a sidecar to the first TEE 500 or as a daemon on the first node 120a.

The system 100 further comprises a remote attestation server 130. The remote attestation server 130 can be utilized for remote attestation of any of the TEEs 500, 200, 300, 400. However, as disclosed above there is a need for improved mechanisms for attestation of the TEEs 500, 200, 300, 400.

The embodiments disclosed herein therefore relate to mechanisms for attesting the first TEE 500 and attesting the second TEE 200. In order to obtain such mechanisms there is provided a second TEE 200, a method performed by the second TEE 200, a computer program product comprising code, for example in the form of a computer program, that when run on processing circuitry of the second TEE 200, causes the second TEE 200 to perform the method. In order to obtain such mechanisms there is further provided a third TEE 300, a method performed by the third TEE 300, and a computer program product comprising code, for example in the form of a computer program, that when run on processing circuitry of the third TEE 300, causes the third TEE 300 to perform the method.

Figure 2:
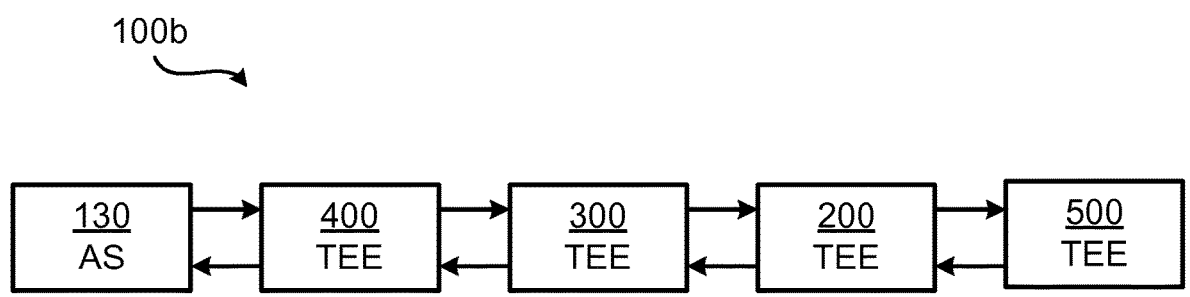
FIG. 2 is a schematic illustration of TEEs according to embodiments.

FIG. 2 schematically illustrates a system 100b illustrating which TEE is performing attestation of which TEE in FIG. 1. In accordance with FIG. 2, the first TEE 500 is attested by the second TEE 200; the second TEE 200 is attested by the third TEE 300, the third TEE 300 is attested the fourth TEE 400, and the fourth TEE 400 is attested by the remote attestation server 130. As will be further disclosed below, during the attestation, the TEE that is attested is populated with a shared key by the attesting TEE. The attestation is performed locally whenever possible, meaning that local attestation only, without involvement from any other node, is striven for whenever possible. In the case where local attestation will not be sufficient to attest a TEE, the TEE will be attested by a TEE running on another node, but kept as close to the attested TEE as possible. Reoccurring remote attestation using a remote attestation server is then avoided and the need for static attestation servers can be minimized.

Figure 3:
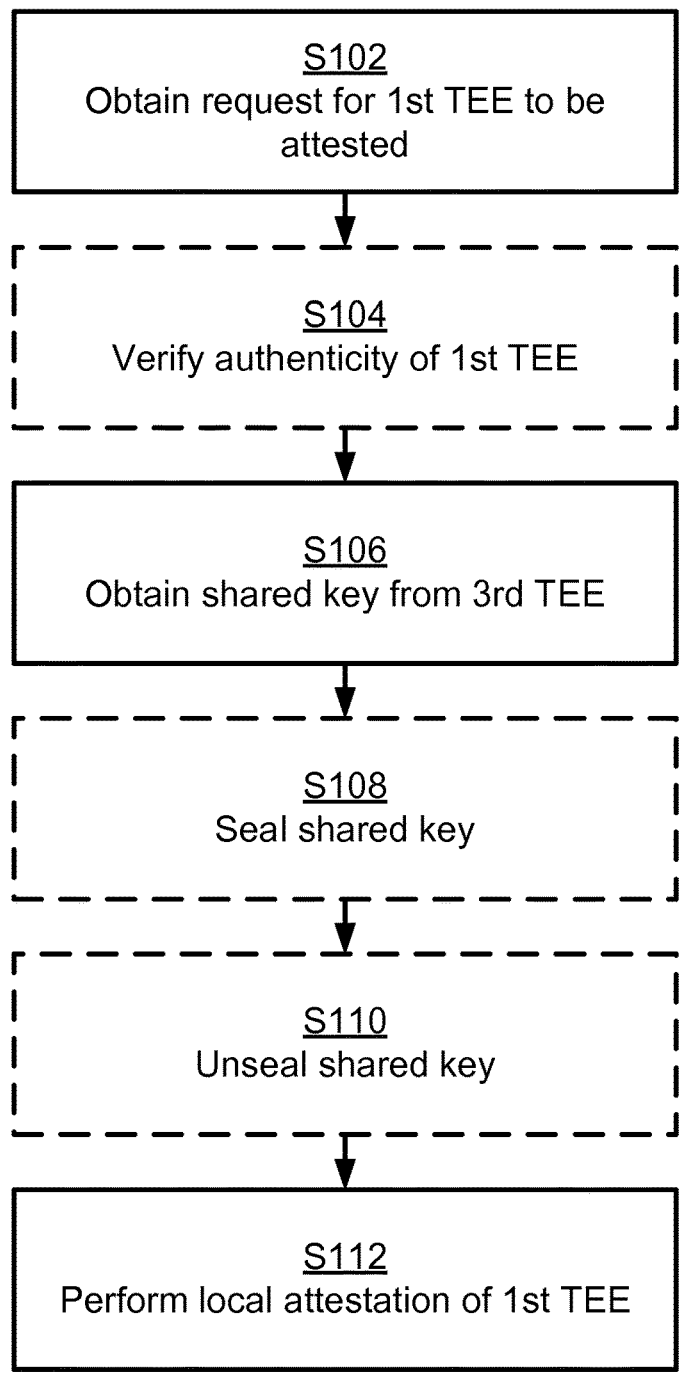
FIGS. 3 and 4 are flowcharts of methods according to embodiments.

Reference is now made to FIG. 3 illustrating a method for attesting the first TEE 500 as performed by the second TEE 200 according to an embodiment. The first TEE 500 resides on a first node 120a and the second TEE 200 also resides on the first node 120a.

It assumed that the first TEE 500 is to be attested by the second TEE 200. Thus, the second TEE 200 is configured to perform step S102:

S102: The second TEE 200 obtains a request from the first TEE 500 to be attested.

For a tenant to be able to populate its TEE with credentials, the tenant can use a shared key, which is a key available at the attester and at all attested TEE. Knowledge of the shared key is considered as a proof of a successfully performed attestation. The tenant or other TEEs can encrypt secrets to be populated at the first TEE 500 with the shared key. The second TEE 200 in response thereto therefore performs step S106.

S106: The second TEE 200 obtains a shared key from a third TEE 300 residing on a second node 120b.

When the first TEE 500 is to be attested, the second TEE 200 is requested to perform a local attestation of the first TEE 500. If the local attestation is successful, the second TEE 200 will populate the first TEE 500 with the shared key. Hence, the second TEE 200 is configured to perform step S112:

S112: The second TEE 200 performs local attestation of the first TEE 500, whereby the first TEE 500 is provided with the shared key from the second TEE 200.

In other words, the first TEE 500 is provided with the shared key from the second TEE 200 upon the local attestation having been carried out successfully. That the first TEE 500 is provided with the shared key from the second TEE 200 is thus a proof of that the local attestation has been carried out successfully.

The first TEE 500 can use the shared key to prove that it is attested. Once the first TEE 500 has been populated with the shared key, the first TEE 500 can thus use the shared key as an identity key to obtain access to system internal information, such as keys, states, and other data stored in a secure storage or held by another TEE in the system 100.

Embodiments relating to further details of attesting the first TEE 500 as performed by the second TEE 200 will now be disclosed.

There may be different examples of shared keys. In some aspects, not the shared key itself, but rather a token containing a derivate of the shared key, is used in the populations. That is according to an embodiment, the shared key is represented by a token containing a derivate of the shared key. Derived secrets such as shared keys, tokens, and derivates, might be computed using one or more key derivation functions. In some examples the shared key of the first TEE 500 is derived from a shared key in possession of the second TEE 200 by using a key derivation function. Further, in some examples the shared key of the second TEE 200 is derived from a shared key in possession of the third TEE 300 by using a key derivation function. In such setup the actual key that is given might be derived from the shared key and a property of the first TEE 500, e.g. given name. Further, in some aspects the key derivation function depends on the result of the attestation. That is, parameters used by the key derivation function when deriving the shared key might depend on the outcome of the attestation. In some examples the shared key is one and the same for all the TEEs. In another examples each TEE has its own individual shared key. Having individual shared keys at each TEE makes it possible to distinguish security between the TEEs (such as between the second TEE 200 and the first TEE 500) and to restrict their access to stored data. An example of a key derivation function is provided in the document entitled "HMAC-based Extract-and-Expand Key Derivation Function (HKDF)", by the Internet Engineering Task Force (IETF), May 2010, ISSN 2070-1721. Other key derivation functions can be used as well.

For the sake of simplicity of the description, direct use of the shared key is however assumed throughout this disclosure, unless otherwise stated.

Further, the shared key might be formed as a plurality of other keys. Yet further, to increase security, the shared key might timely be replaced in the system 100, starting from the third TEE 300, the remote attestation server 130, or the fourth TEE 400.

In some aspects the second TEE 200 is inactivated, or even non-existent when the first TEE 500 is started. In such aspects the second TEE 200 needs to be activated, or started up and be remotely attested before it can attest the first TEE 500. To be able to attest the first TEE 500, the second TEE 200 is activated, or started, by the first TEE 500 on the same node 120a as the first TEE 500, when the first TEE 500 needs to be populated. That is, according to an embodiment, the second TEE 200 is started up in response to the first TEE 500 requesting to be attested.

The second TEE 200 might, when being started up, be remotely attested. Particularly, according to an embodiment, the second TEE 200, as part of obtaining the shared key, is remotely attested by the third TEE 300. That is, the second TEE 200 might be remotely attested by the third TEE 300 whereby the second TEE 200 obtains the shared key from the third TEE 300 during the remote attestation.

In some aspects the second TEE 200 is ephemeral. In other aspects the second TEE 200 is long-lived (i.e., not ephemeral). In case the second TEE 200 is ephemeral, the second TEE 200 might seal the shared key when it has retrieved the shared key and unseal the shared key whenever needing it. If no sealed shared key exists in the second TEE 200, the second TEE 200 will, as disclosed above, instead be remotely attested by the third TEE 300 to obtain the shared key from the tenant (by means of the remote attestation server 130 or the fourth TEE 400) and then the second TEE 200 will seal the shared key for future use. Hence, according to an embodiment the second TEE 200 is configured to perform steps S108 and S110:

S108: The second TEE 200 seals the shared key upon obtaining the shared key from the third TEE 300.

S110: The second TEE 200 unseals the shared key in conjunction with performing local attestation of the first TEE 500.

In some aspects the second TEE 200 holds a whitelist of acceptable first TEEs 500. This whitelist can be made with respect to signer of the TEE and/or with respect to the content of the TEE. The whitelist might comprise acceptable used signing keys (e.g., represented by MRSIGNER values) and/or acceptable hashes of the acceptable TEEs (e.g., each acceptable TEE being represented by a MRENCLAVE value). The second TEE 200 might then compare the first TEE 500 to the whitelist before obtaining the shared key from the third TEE 200. Particularly, according to an embodiment, the request from the first TEE 500 to be attested comprises an identifier of the first TEE 500, and the second TEE 200 is configured to perform S104:

S104: The second TEE 200 verifies authenticity (integrity and origin) of the first TEE 500 by comparing the identifier to a whitelist of identifiers.

The whitelist can be received by the second TEE 200 during and/or after its own attestation was carried out by the third TEE 300, or it can be hardcoded in the second TEE 200. That is, according to an embodiment, the whitelist is obtained from the third TEE 300 as part of, or upon, being remotely attested by the third TEE 300.

There could be different ways for the second TEE 200 to obtain the shared key from the third TEE 300. In some aspects a challenge-response scheme is used for the second TEE 200 to obtain the shared key from the third TEE 300. In particular, according to an embodiment, the shared key is obtained from the third TEE 300 upon successful authentication established by a challenge-response procedure performed between the second TEE 200 and the third TEE 300.

There could be different ways for the second TEE 200 to provide the shared key to the first TEE 500. In some aspects a challenge-response scheme is used for the second TEE 200 to provide the shared key to the first TEE 500. In particular, according to an embodiment, the shared key is provided to the first TEE 500 upon successful authentication established by a challenge-response procedure performed between the second TEE 200 and the first TEE 500.

Figure 4:
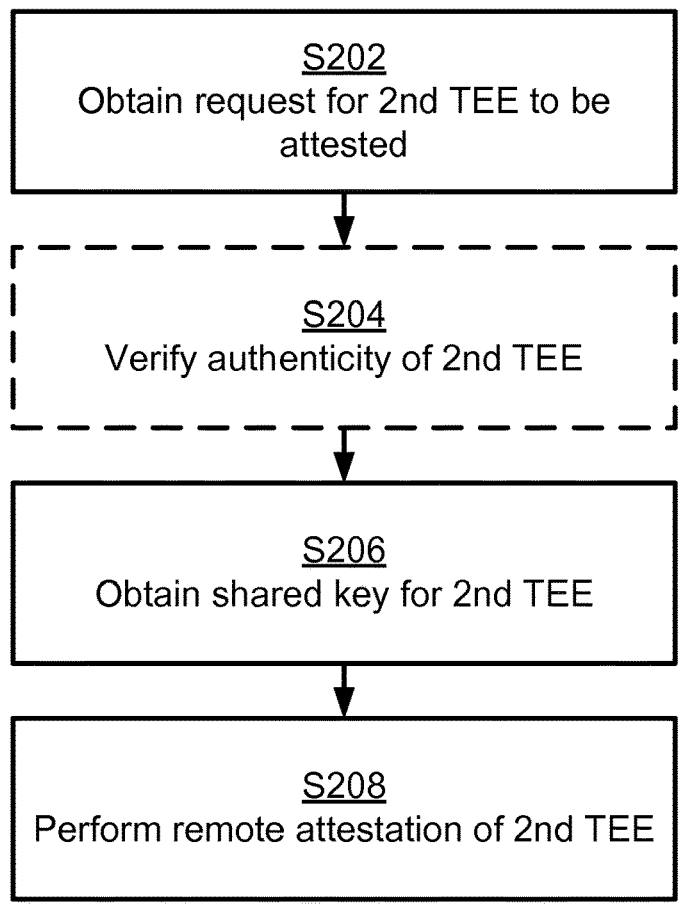

Reference is now made to FIG. 4 illustrating a method for attesting the second TEE 200 as performed by the third TEE 300 according to an embodiment. The second TEE 200 resides on a first node 120*a* and the third TEE 300 resides on a second node 120*b*.

S202: The third TEE 300 obtains a request from the second TEE 200 to be attested.

The third TEE 300 in response thereto performs steps S206 and S208.

S206: The third TEE 300 obtains a shared key for the second TEE 200.

S208: The third TEE 300 performs remote attestation of the second TEE 200, whereby the second TEE 200 is provided with the shared key from the third TEE 300.

In other words, the second TEE 200 is provided with the shared key from the third TEE 300 upon the remote attestation having been carried out successfully. That the second TEE 200 is provided with the shared key from the third TEE 300 is thus a proof of that the remote attestation has been carried out successfully.

Embodiments relating to further details of attesting the second TEE 200 as performed by the third TEE 300 will now be disclosed.

There could be different ways for the third TEE 300 to obtain the shared key for the second TEE 200 in S206.

In some aspects the third TEE 300 already has access to the shared key. Particularly, according to an embodiment, the third TEE 300, as part of obtaining the shared key, unseals the shared key.

In some aspects the third TEE 300 does not already have access to the shared key. Then the third TEE 300 needs to be attested. In case another already started, or at least attested TEE is populated on the same node 120*b* as the third TEE 300, the third TEE 300 might be locally attested by such a TEE (and thus in the same manner as the first TEE 500 is locally attested by the second TEE 200 as disclosed above). Otherwise the third TEE 300 needs to be remotely attested in order to obtain the shared key. Particular, according to an embodiment, the third TEE 300, as part of obtaining the shared key, is remotely attested by a remote attestation server 130 or a fourth TEE 400.

In some aspects the second TEE 200 holds a whitelist of acceptable first TEEs 500. This whitelist can be made with respect to signer of the TEE and/or with respect to the content the TEE. The whitelist might comprise acceptable used signing keys (e.g., represented by MRSIGNER values) and/or acceptable hashes of the acceptable TEEs (e.g., each acceptable TEE being represented by a MRENCLAVE value). In the case where the third TEE 300 and the second TEE 200 reside on different nodes 120*a*, 120*b*, or hardware, an attestation where the third TEE 300 holds information about acceptable nodes, or hardware, in the untrusted computational, or cloud, environment 110 can be used. The third TEE 300 might then compare the second TEE 200 to the whitelist before obtaining the shared key. Particularly, according to an embodiment, the request from the second TEE 200 to be attested comprises an identifier of the second TEE 200, and the third TEE 300 is configured to perform S204:

S204: The third TEE 300 verifies authenticity (integrity and origin) of the second TEE 200 by comparing the identifier to a whitelist of identifiers.

In some examples the whitelist is obtained from the remote attestation server 130 or the fourth TEE 400 as part of, or upon, remote attestation of the third TEE 300.

As disclosed above, according to an embodiment the shared key is provided to the second TEE 200 upon successful challenge-response authentication between the third TEE 300 and the second TEE 200.

A first particular embodiment for attesting a TEE based on at least some of the above disclosed embodiments will now be disclosed in detail.

S301: The first TEE 500 is started by the tenant or by another TEE. The tenant (or the first TEE 500 itself) needs to check whether one or more TEEs exists on the system 100 and whether any of these TEEs reside on the same node 120*a* as the first TEE 500. If another TEE 200 is already available on the same node 120a as the first TEE 500, step S302a is entered. Else, step S302b is entered.

S302a: If another TEE 200 is already available on the same node 120a, the first TEE 500 requests this TEE 200 for local attestation.

S302b: If no TEE 200 is available on the same node 120a as the first TEE 500, then the such a TEE 200 needs to be started, for instance by the tenant. The TEE 200 is started in a way so that it ends up on the same node 120a as the first TEE 500.

If there is an existing third TEE 300 in the system 100, the newly started second TEE 200 will be attested and populated with the shared key from the third TEE 300. If no populated third TEE 300 exists in the system 100, the third TEE 300 will need to be remotely attested and populated with the shared key by the tenant. When found, or started, the second TEE 200 on the same node 120 as the first TEE 500 is running, can provide the shared key to the first TEE 500 by local attestation.

A second particular embodiment for attesting a TEE based on at least some of the above disclosed embodiments will now be disclosed in detail. In this embodiment it is assumed that the second TEE 200 is a sidecar to the first TEE 500, that the second TEE 200 and/or the third TEE 300 is/are ephemeral, and that sealing of the shared key is used.

S401: The first TEE 500 and its sidecar TEE (i.e., the second TEE 200) are started by the tenant or another TEE. The second TEE 200 checks whether or not a sealed shared key is available for the node 120a (or hardware) on which the second TEE 200 is started. If a sealed shared key is available, S402a is entered, and else S402b is entered.

S402a: If a sealed shared key for the same node 120a (or hardware) as the second TEE 200 is running on is available in a software blob, the second TEE 200 can unseal the software blob to obtain the shared key, assumed that the software version has not been updated for the second TEE 200 since the sealing. S403 is then entered.

S402b: If a sealed shared key for the same node 120a (or hardware) as the second TEE 200 is running on is not available in a software blob, the second TEE 200 has to be attested and populated with the shared key from the third TEE 300. Also the third TEE 300 might be ephemeral which has in an earlier run sealed the shared key and can now unseal it to obtain it. If no populated third TEE 300 exists in the system 100, the third TEE 300 will need to be remotely attested and populated with the shared key by the tenant (by means of the remote attestation server 130 or the fourth TEE 400). The second TEE 200 then seals the shared key for future use and can also populate the first TEE 500 with the shared key after local attestation of the first TEE 500. S403 is then entered.

S403: The first TEE 500 obtains the shared key by being locally attested by the second TEE 200.

A third particular embodiment for attesting a TEE based on at least some of the above disclosed embodiments will now be disclosed in detail. This embodiment describes an example of how the second TEE 200 can be populated with the shared key by the third TEE 300. The same principle can be used for the first TEE 500 to be populated with the shared key by the second TEE 200.

S501: The second TEE 200 requests the shared key from the third TEE 300.

S502: The third TEE 300 sends a challenge to the second TEE 200 with a request of a report from the second TEE 200.

S503: The second TEE 200 creates, for instance by using a quoting TEE residing on the same node 120a (or hardware) as the second TEE 200 and with the task to provide characteristics of the used trusted execution environment of the second TEE 200, a signed report which is sent to the third TEE 300 for evaluation.

S504: The third TEE 300 compares the report with its whitelists, with regards to contents and/or signer of the second TEE 200 and characteristics of the node 120a (or hardware) second TEE 200 resides on. If the result is acceptable, the second TEE 200 will be populated with the shared key from the third TEE 300.

In summary, according to the embodiments disclosed herein there has been provided efficient attestation and population of numerous, secure, virtualized micro-services running as TEEs in containers in a non-trusted computational, or cloud, environment. The population might be regarded as a means to in an efficient manner provide (ephemeral) TEEs access to secure storage of the system to which the TEEs belong, which will give the TEEs access to relevant data.

Figure 5:
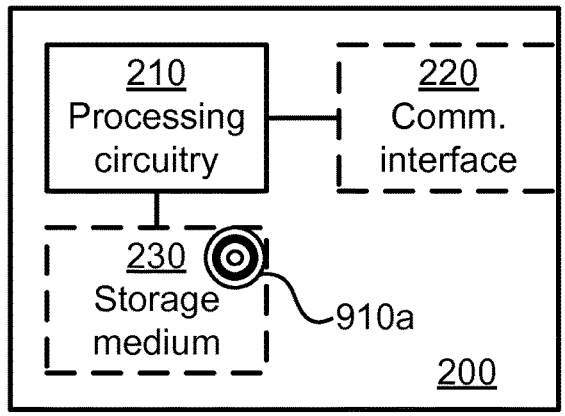
FIG. 5 is a schematic diagram showing functional units of a TEE according to an embodiment.

FIG. 5 schematically illustrates, in terms of a number of functional units, the components of a second TEE 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910a (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the second TEE 200 to perform a set of operations, or steps, as disclosed above. For example, the storage medium 230 may store the set of operations, and the processing circuitry 210 may be configured to retrieve the set of operations from the storage medium 230 to cause the second TEE 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The second TEE 200 may further comprise a communications interface 220 for communications with other functions, nodes, entities, and devices of the system 100, such as at least other TEEs. As such the communications interface 220 may comprise one or more transmitters and receivers, comprising analogue and digital components.

The processing circuitry 210 controls the general operation of the second TEE 200 e.g. by sending data and control signals to the communications interface 220 and the storage medium 230, by receiving data and reports from the communications interface 220, and by retrieving data and instructions from the storage medium 230. Other components, as well as the related functionality, of the second TEE 200 are omitted in order not to obscure the concepts presented herein.

Figure 6:
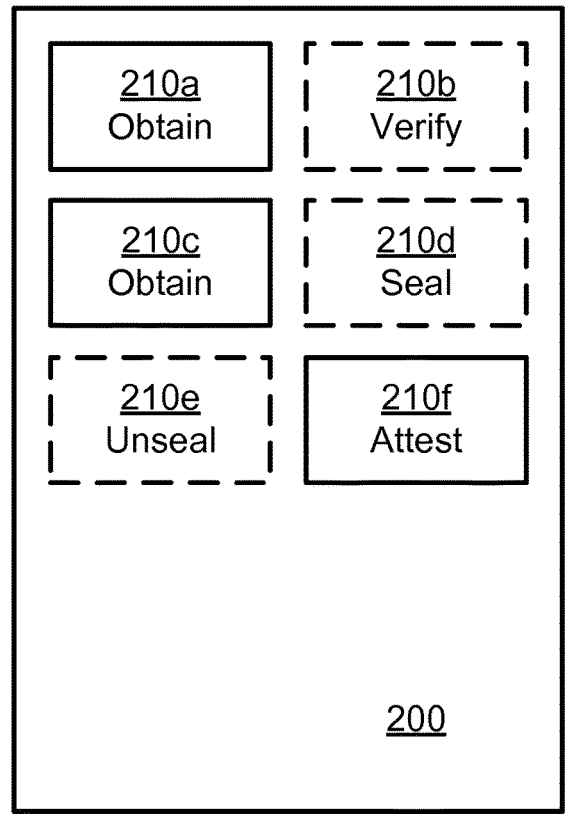
FIG. 6 is a schematic diagram showing functional modules of a TEE according to an embodiment.

FIG. 6 schematically illustrates, in terms of a number of functional modules, the components of a second TEE 200 according to an embodiment. The second TEE 200 of FIG. 6 comprises a number of functional modules; an obtain module 210a configured to perform step S102, an obtain module 210c configured to perform step S106, and an attest module 210f configured to perform step S112. The second TEE 200 of FIG. 6 may further comprise a number of optional functional modules, such as any of a verify module 210b configured to perform step S104, a seal module 210d configured to perform step S108, and an unseal module 210e configured to perform step S110. In general terms, each functional module 210a-210f may be implemented in hardware or in software. Preferably, one or more or all functional modules 210a-210f may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210f and to execute these instructions, thereby performing any steps of the second TEE 200 as disclosed herein.

Figure 7:
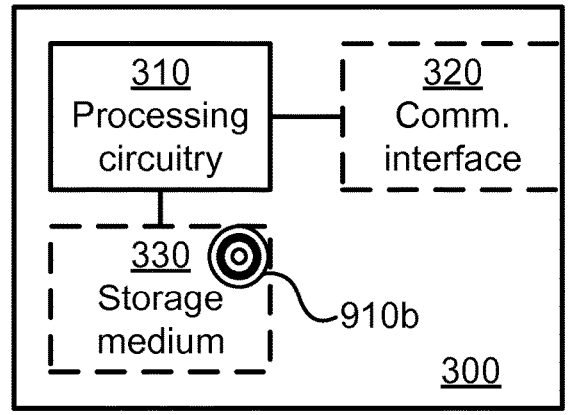
FIG. 7 is a schematic diagram showing functional units of a TEE according to an embodiment.

FIG. 7 schematically illustrates, in terms of a number of functional units, the components of a third TEE 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 910b (as in FIG. 9), e.g. in the form of a storage medium 330. The processing circuitry 310 may further be provided as at least one application specific integrated circuit (ASIC), or field programmable gate array (FPGA).

Particularly, the processing circuitry 310 is configured to cause the third TEE 300 to perform a set of operations, or steps, as disclosed above. For example, the storage medium 330 may store the set of operations, and the processing circuitry 310 may be configured to retrieve the set of operations from the storage medium 330 to cause the third TEE 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The third TEE 300 may further comprise a communications interface 320 for communications with other functions, nodes, entities, and devices of the system 100, such as other TEEs, the remote attestation server 130, and the fourth TEE 400. As such the communications interface 320 may comprise one or more transmitters and receivers, comprising analogue and digital components.

The processing circuitry 310 controls the general operation of the third TEE 300 e.g. by sending data and control signals to the communications interface 320 and the storage medium 330, by receiving data and reports from the communications interface 320, and by retrieving data and instructions from the storage medium 330. Other components, as well as the related functionality, of the third TEE 300 are omitted in order not to obscure the concepts presented herein.

Figure 8:
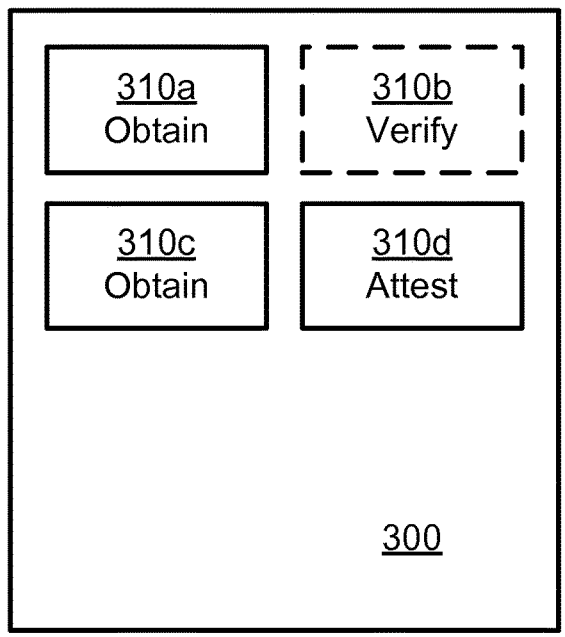
FIG. 8 is a schematic diagram showing functional modules of a TEE according to an embodiment.

FIG. 8 schematically illustrates, in terms of a number of functional modules, the components of a third TEE 300 according to an embodiment. The third TEE 300 of FIG. 8 comprises a number of functional modules; an obtain module 310a configured to perform step S202, an obtain module 310c configured to perform step S206, and an attest module 310d configured to perform step S208. The third TEE 300 of FIG. 8 may further comprise a number of optional functional modules, such as a verify module configured to perform step S204. In general terms, each functional module 310a-310d may be implemented in hardware or in software. Preferably, one or more or all functional modules 310a-310d may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310d and to execute these instructions, thereby performing any steps of the third TEE 300 as disclosed herein.

The second TEE 200 and/or third TEE 300 may be provided as respective standalone devices or as a part of at least one further device. As noted above, the second TEE 200 might be provided on a first node 120a and the third TEE 300 might be provided on a second node 120b. Therefore, although a single processing circuitry 210, 310 is illustrated in FIGS. 5 and 7 the processing circuitry 210, 310 may be distributed among a plurality of devices, or nodes. The same applies to the functional modules 210a-210f, 310a-310d of FIGS. 6 and 8 and the computer programs 920a, 920b of FIG. 9.

Figure 9:
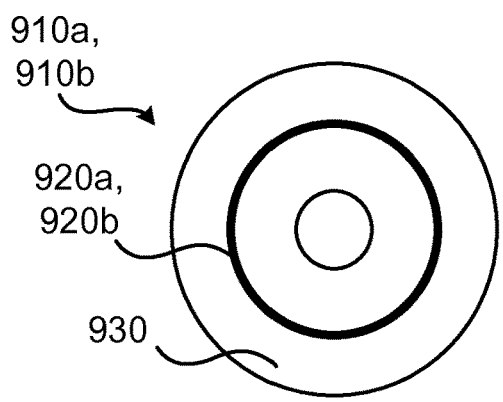
FIG. 9 shows one example of a computer program product comprising computer readable means according to an embodiment.

FIG. 9 shows one example of a computer program product 910a, 910b comprising computer readable means 930. On this computer readable means 930, a computer program 920a can be stored, which computer program 920a can cause the processing circuitry 210 and thereto operatively coupled entities and devices, such as the communications interface 220 and the storage medium 230, to execute methods according to embodiments described herein. The computer program 920a and/or computer program product 910a may thus provide means for performing any steps of the second TEE 200 as herein disclosed. On this computer readable means 930, a computer program 920b can be stored, which computer program 920b can cause the processing circuitry 310 and thereto operatively coupled entities and devices, such as the communications interface 320 and the storage medium 330, to execute methods according to embodiments described herein. The computer program 920b and/or computer program product 910b may thus provide means for performing any steps of the third TEE 300 as herein disclosed.

In the example of FIG. 9, the computer program product 910a, 910b is illustrated as an optical disc, such as a CD (compact disc) or a DVD (digital versatile disc) or a Blu-Ray disc. The computer program product 910a, 910b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920a, 920b is here schematically shown as a track on the depicted optical disk, the computer program 920a, 920b can be stored in any way which is suitable for the computer program product 910a, 910b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for attesting a first trusted execution environment, TEE, residing on a first node, the method being performed by a second TEE also residing on the first node, the method comprising:
   obtaining a request from the first TEE to be attested; and in response thereto:
   obtaining a shared key from a third TEE residing on a second node, the shared key being represented by a token containing a derivative of the shared key, the derivative being derived from the shared key and a property of the first TEE, the shared key being obtained from the third TEE upon successful authentication established by a challenge-response procedure performed between the second TEE and the third TEE; and
   performing local attestation of the first TEE, whereby the first TEE is provided with the shared key from the second TEE.

2. The method according to claim 1, wherein the second TEE is started up in response to the first TEE requesting to be attested.

3. The method according to claim 1, wherein the second TEE, as part of obtaining the shared key, is remotely attested by the third TEE.

4. The method according to claim 1, further comprising:
   sealing the shared key upon obtaining the shared key from the third TEE; and
   unsealing the shared key in conjunction with performing local attestation of the first TEE.

5. The method according to claim 1, wherein the request from the first TEE to be attested comprises an identifier of the first TEE, the method further comprising:
   verifying authenticity of the first TEE by comparing the identifier to a whitelist of identifiers.

6. The method according to claim 3, wherein the request from the first TEE to be attested comprises an identifier of the first TEE, the method further comprising verifying authenticity of the first TEE by comparing the identifier to a whitelist of identifiers, wherein the whitelist is obtained from the third TEE as part of being remotely attested by the third TEE.

7. The method according to claim 1, wherein the second TEE is provided as a sidecar to the first TEE or as a daemon on the first node.

8. The method according to claim 1, wherein the first TEE and the second TEE share hardware on the first node.

9. A second trusted execution environment, TEE, for attesting a first TEE residing on a first node, the second TEE also residing on the first node and comprising processing circuitry, the processing circuitry being configured to cause the second TEE to:
   obtain a request from the first TEE to be attested; and in response thereto:
   obtain a shared key from a third TEE residing on a second node, the shared key being represented by a token containing a derivative of the shared key, the derivative being derived from the shared key and a property of the first TEE, the shared key being obtained from the third TEE upon successful authentication established by a challenge-response procedure performed between the second TEE and the third TEE; and
   perform local attestation of the first TEE, whereby the first TEE is provided with the shared key from the second TEE.

10. The second TEE according to claim 9, wherein the second TEE is started up in response to the first TEE requesting to be attested.

11. The second TEE according to claim 9, wherein the second TEE, as part of obtaining the shared key, is remotely attested by the third TEE.

12. The second TEE according to claim 9, the second TEE being further configured to seal the shared key upon obtaining the shared key from the third TEE, and unseal the shared key in conjunction with performing local attestation of the first TEE.

13. The second TEE according to claim 9, wherein the request from the first TEE to be attested comprises an identifier of the first TEE, the second TEE being further configured to verify authenticity of the first TEE by comparing the identifier to a whitelist of identifiers.

14. The second TEE according to claim 11, wherein the request from the first TEE to be attested comprises an identifier of the first TEE, the second TEE being further configured verify authenticity of the first TEE by comparing the identifier to a whitelist of identifiers, wherein the whitelist is obtained from the third TEE as part of being remotely attested by the third TEE.

15. The second TEE according to claim 9, wherein the second TEE is provided as a sidecar to the first TEE or as a daemon on the first node.

16. The second TEE according to claim 9, wherein the first TEE and the second TEE share hardware on the first node.

* * * * *